United States Patent
Wang

(10) Patent No.: US 8,732,960 B2
(45) Date of Patent: May 27, 2014

(54) FLORAL SCISSORS ASSEMBLY

(75) Inventor: Kuang-Pin Wang, Taichung (TW)

(73) Assignee: Green Guard Industry Ltd., Taichung (TW)

( * ) Notice: Subject to any disclaimer, the term of this patent is extended or adjusted under 35 U.S.C. 154(b) by 160 days.

(21) Appl. No.: 13/349,249

(22) Filed: Jan. 12, 2012

(65) Prior Publication Data

US 2013/0031786 A1 Feb. 7, 2013

(30) Foreign Application Priority Data

Aug. 5, 2011 (TW) .............................. 100214529 U

(51) Int. Cl.
 *B26B 13/00* (2006.01)
(52) U.S. Cl.
 USPC .................... 30/244; 30/250; 30/251; 30/261
(58) Field of Classification Search
 USPC ........... 30/251, 250, 244, 249, 131, 132, 254, 30/261, 185
 See application file for complete search history.

(56) References Cited

U.S. PATENT DOCUMENTS

| | | | | |
|---|---|---|---|---|
| 4,094,064 A | * | 6/1978 | Nishikawa et al. | 30/92 |
| RE30,613 E | * | 5/1981 | Nakamura et al. | 30/94 |
| 4,674,184 A | * | 6/1987 | Anderson | 30/92 |
| 5,511,314 A | * | 4/1996 | Huang | 30/251 |
| 5,709,030 A | * | 1/1998 | Wang | 30/251 |
| 5,950,313 A | * | 9/1999 | Herrmann et al. | 30/228 |
| 7,328,513 B1 | * | 2/2008 | Yang | 30/178 |
| 7,454,837 B2 | * | 11/2008 | Shan | 30/254 |
| 8,166,659 B2 | * | 5/2012 | Huang | 30/254 |
| 8,458,912 B2 | * | 6/2013 | Linden et al. | 30/131 |
| 2007/0079512 A1 | * | 4/2007 | Nelson et al. | 30/123.3 |
| 2008/0168870 A1 | * | 7/2008 | Caravello | 81/321 |
| 2008/0289186 A1 | * | 11/2008 | Adams | 30/92 |
| 2009/0293288 A1 | * | 12/2009 | Hernandez | 30/251 |
| 2011/0283545 A1 | * | 11/2011 | Wu | 30/250 |
| 2012/0047750 A1 | * | 3/2012 | Maag et al. | 30/251 |

* cited by examiner

*Primary Examiner* — Omar Flores Sanchez
(74) *Attorney, Agent, or Firm* — Muncy, Geissler, Olds & Lowe, P.C.

(57) ABSTRACT

An improved floral scissors assembly includes a clamping jaw extended from a top end of a first handle, a blade, a second handle pivotally coupled to the bottom of the clamping jaw, a long hole formed on the blade, plural stop protrusions formed in the long hole, and a link rod installed between the second handle and the blade. The link rod has an end extended into the long hole by a stop pin and the other end coupled to a switching mechanism including a slice member and a stop portion. The stop portion is situated at an upper or lower fixed position. An active end of the link rod is switchably limited by the stop portion at the upper or lower fixed position, and the stop pin is moved in an opposite direction of the active end and between the upper and lower ends in the long hole.

5 Claims, 13 Drawing Sheets

FLORAL SCISSORS ASSEMBLY

BACKGROUND OF THE INVENTION

1. Field of the Invention

The present invention relates to an improved floral scissors assembly, in particular to a pair of garden scissors assembly switchable to a multi-stage type or a single-stage type.

2. Description of the Related Art

In FIG. 12, a conventional floral scissors assembly comprises two handles 90, 91, a clamping jaw 92 and a blade 93, and the clamping jaw 92 is combined to the handle 90, and the blade 93 is coupled to the handle 91, such that when a user holds the two handles 90, 91 by hands to apply a force, the two handles 90, 91 approach each other to move a cutting-edge portion 930 of the blade 93 in a direction towards the clamping jaw 92 to cut stems or branches of flowers and trees.

The conventional floral scissors assembly comes with a labor-saving structure, wherein the blade 93 has a long hole 931 formed at another end of the cutting-edge portion 930, and the long hole 931 has a plural sections of stop protrusions 932, and the handle 91 coupled to the blade 93 is extended into the long hole 931 through an end of a link rod 910 by a stop pin 911. In FIG. 13, when a user holds the handles 90, 91 to apply a force, the stop pin 911 in the long hole 931 is moved from the bottom end and across the stop protrusion 932 to the top end, so as to provide a labor-saving effect for a multi-stage shear.

However, if the conventional floral scissors are used for cutting softer branches, the conventional floral scissors need not to leverage the labor-saving effect since the branches are soft, and the labor-saving effect may take more time for the cutting. In other words, the conventional floral scissors cannot cut the branches quickly by a single-stage operation, and the design of the conventional floral scissors capable of switching to a single-stage operation has a certain level of difficulty.

SUMMARY OF THE INVENTION

Therefore, it is a primary objective of the present invention to provide an improved floral scissors assembly capable of switching to a multi-stage labor-saving cutting mode or a single-stage quick cutting mode, so as to provide a convenient operation of the floral scissors for horticultural cutting.

To achieve the foregoing objective, the present invention provides an improved floral scissors assembly, comprising:

a first handle, having a first pivoting portion disposed at a top end of the first handle, and a clamping jaw integrally extended in a lateral direction from the first pivoting portion;

a blade, having a cutting-edge portion, and pivotally coupled to the first pivoting portion by a root portion of the cutting-edge portion, and the cutting-edge portion being disposed at the top of the first pivoting portion and facing the clamping jaw, and the blade having a long hole formed at an end extended from an internal side of the first pivoting portion, and a stop protrusion having a plurality of sections formed on a sidewall of the long hole and provided for the cutting-edge portion to cut with sections;

a second handle, having a second pivoting portion disposed at a top end of the second handle and pivotally coupled to the bottom of the clamping jaw; a link rod, having a passive end, and the passive end having a stop pin passed into the long hole, and an active end disposed at the other end of the passive end and extended into the second handle;

a switching mechanism, installed at the second handle, and proximate to the second pivoting portion, and the switching mechanism including a slice member exposed from an external side of the second handle, and at least one stop portion disposed on an internal side of the second handle, and the at least one stop portion including an upper fixed position and a lower fixed position on the internal side of the second handle, and the active end of the link rod being switchably limited at the upper fixed position and the lower fixed position by the at least one stop portion, and the stop pin being moved in an opposite direction of the active end and between the upper end and the lower end in the long hole.

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

Figure 1:
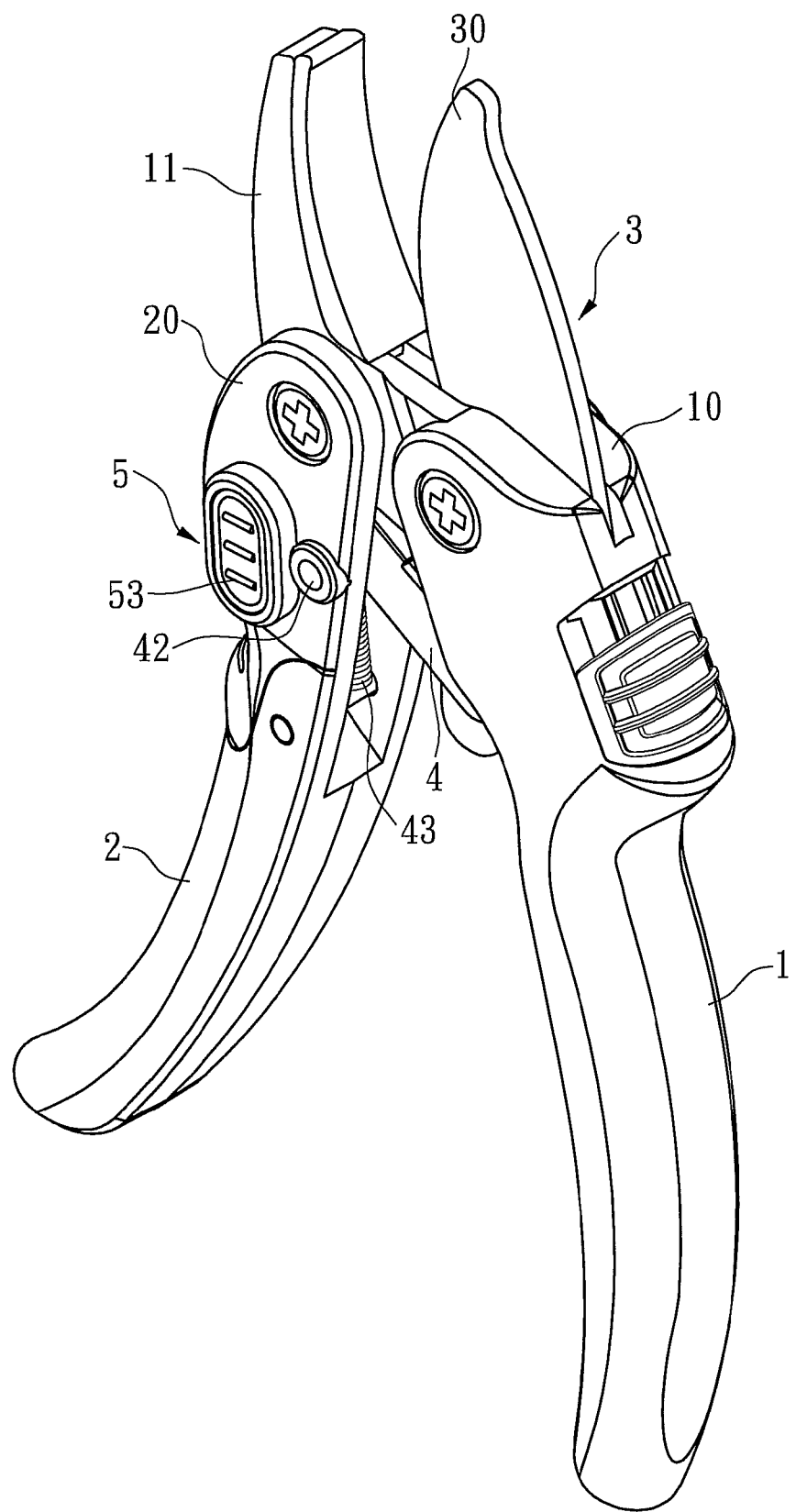
FIG. 1 is a perspective view of a first preferred embodiment of the present invention.
Figure 2:
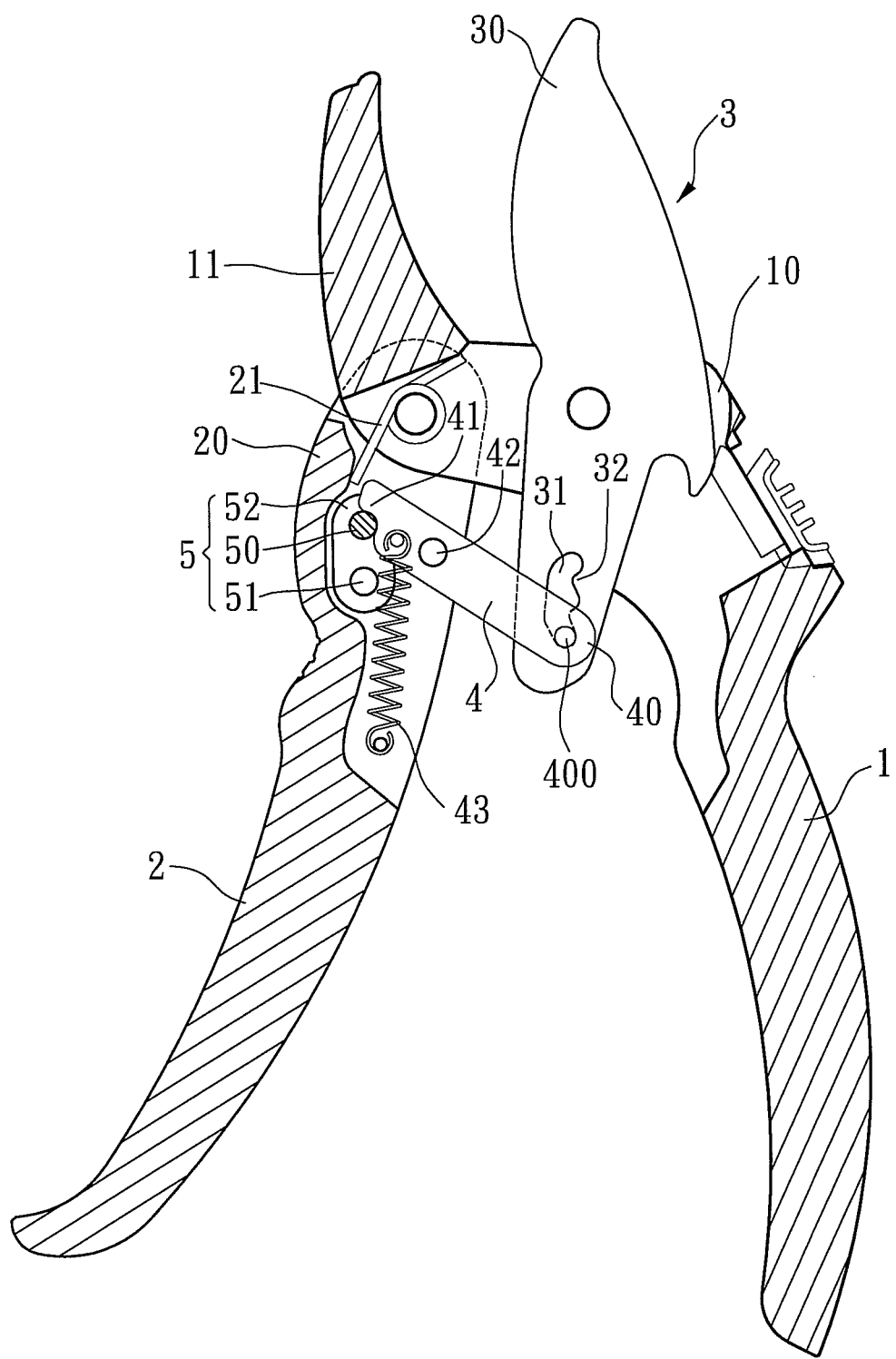
FIG. 2 is a cross-sectional view of an active end of a link rod being limited at an upper fixed position in accordance with the first preferred embodiment of the present invention.

With reference to FIGS. 1 and 2 for an improved floral scissors assembly in accordance with a first preferred embodiment of the present invention, the improved floral scissors assembly comprises a first handle 1, a second handle 2, a blade 3, a link rod 4 and a switching mechanism 5.

The first handle 1 has a first pivoting portion 10 disposed at a top end of the first handle 1, and a clamping jaw 11 integrally and laterally extended from the first pivoting portion 10.

The blade 3 has a cutting-edge portion 30, and the blade 3 is pivotally coupled to the first pivoting portion 10 by a root portion of the cutting-edge portion 30 the cutting-edge portion 30 and disposed above the first pivoting portion 10 and facing towards the clamping jaw 11, and the blade 3 extended from an internal side of the first pivoting portion 10 has a long hole 31 formed at an end of the blade 3, and a plural sections of stop protrusions 32 formed on a sidewall of the long hole 31.

The second handle 2 has a second pivoting portion 20 disposed at a top end of the second handle 2, and the second handle 2 is pivotally coupled to the bottom of the clamping jaw 11 by the second pivoting portion 20.

The link rod 4 has a passive end 40, and the passive end 40 has a stop pin 400 passed into the long hole 31, and the other end of the passive end of the link rod 4 is an active end 41, and the active end 41 is extended into the second handle 2.

The switching mechanism 5 is installed at the second handle 2 and disposed proximate to the second pivoting portion 20, and the switching mechanism 5 comprises a slice member, a first stop portion 50 and a second stop portion 51, wherein the slice member has a first switching button 52 and a second switching button 53 embedded into both sides of the second handle 2 respectively, and the first switching button 52 and second switching button 53 are exposed from both sides of the second handle 2 respectively, and a first stop portion 50 and a second stop portion are disposed between the first switching button 52 and the second switching button 53, and the first stop portion 50 of this preferred embodiment is a transverse rod with an end fixed to the first switching button 52 and a hollow is formed between the other end and the second switching button 53, and the second stop portion 51 is also a transverse rod coupled to the second stop portion 51 to connect the first switching button 52 and the second switching button 53, and the first stop portion 50 and second stop portion 51 are disposed on an internal side of the second handle 2. The first stop portion 50 is disposed above the second stop portion 51, and the position of the first stop portion 50 is defined as an upper fixed position, which is the position of the active end 41 of the link rod 4 being limited by the first stop portion 50, and the position of the second stop portion 51 is defined as a lower fixed position, which is the position of the active end 41 of the link rod 4 being limited by the second stop portion 51.

At the position of the link rod 4 proximate to the active end 41 of this preferred embodiment, a shaft 42 is pivotally coupled to the second handle 2, and both ends of the link rod 4 are swung by using the shaft 42 as a fulcrum, and the active end 41 is maintained to be downwardly pulled by a tension spring 43.

A torque spring 21 is installed between the second pivoting portion 20 of the second handle 2 and the clamping jaw 11 and an end of the torque spring 21 abuts an internal side of the second pivoting portion 20 of the second handle 2, and the other end of the torque spring 21 abuts an internal side of the clamping jaw 11, and the torque spring 21 is provided for spreading open the two handles when pressed, and resuming their original positions when released.

Figure 3:
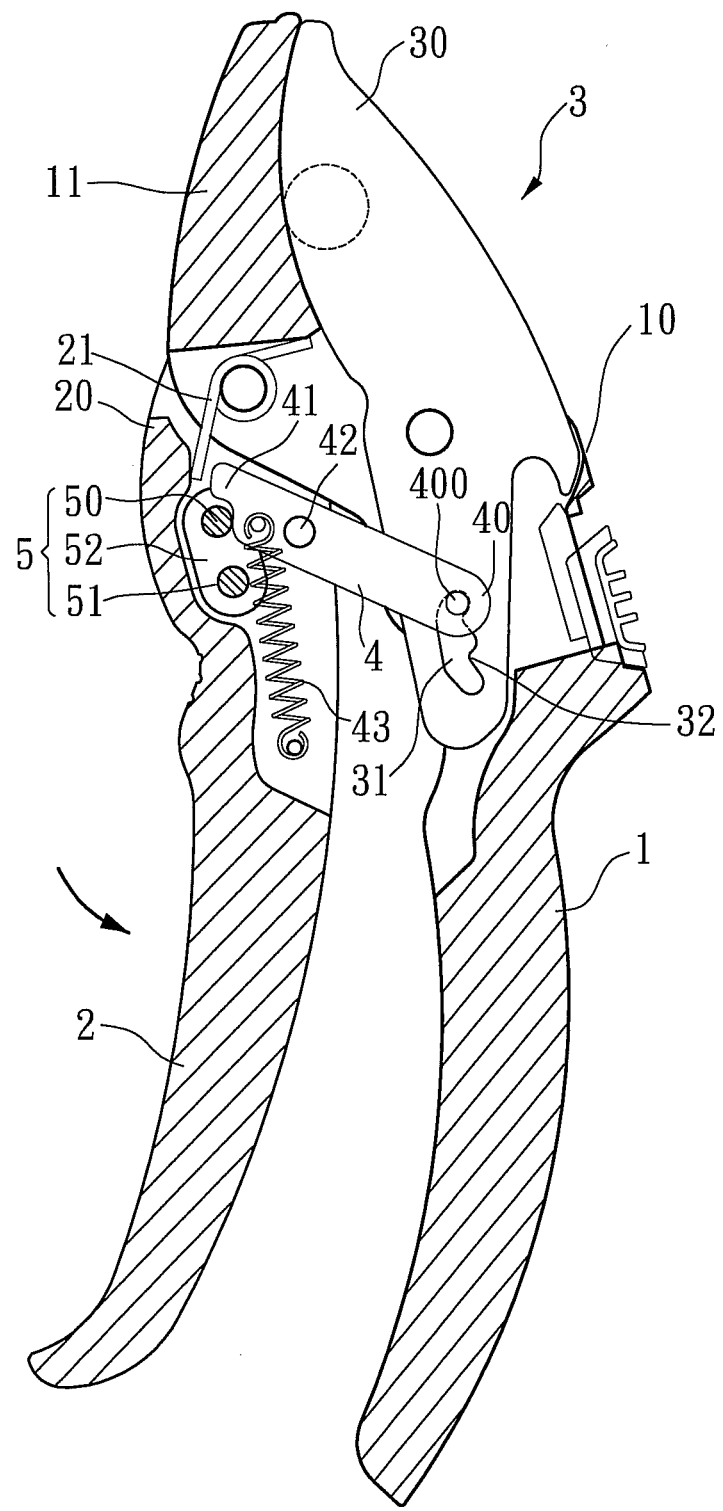
FIG. 3 is a cross-sectional view of pressing to engage two handles with each other in accordance with the first preferred embodiment of the present invention.

During the operation of the floral scissors of the present invention, a user holds the first handle 1 and the second handle 2 by a palm as shown in FIG. 3 and applies a force to move the second handle 2 towards the first handle 1, so that the switching mechanism 5 drives the active end 41 of the link rod 4 to make the stop pin 400 installed at the passive end 40 to drive the blade 3 in the long hole 31, and the cutting-edge portion 30 of the blade 3 cuts in direction towards the clamping jaw 11. When the user releases the second handle 2, the second handle 2 resumes its spread-open position by the resilience of the torque spring 21 as shown in FIG. 2.

Figure 4:
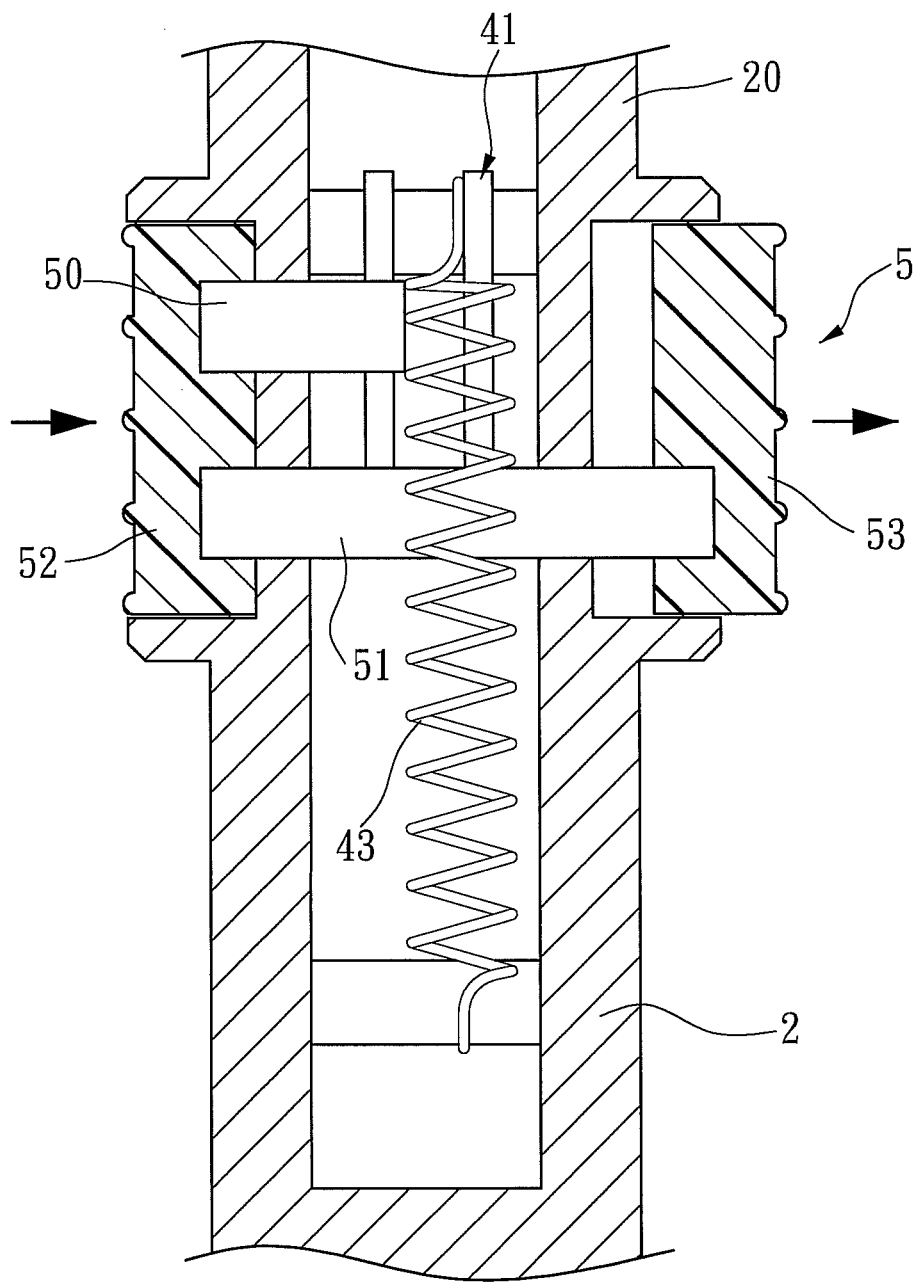
FIG. 4 is a cross-sectional view of pressing a first switching button in accordance with the first preferred embodiment of the present invention.
Figure 5:
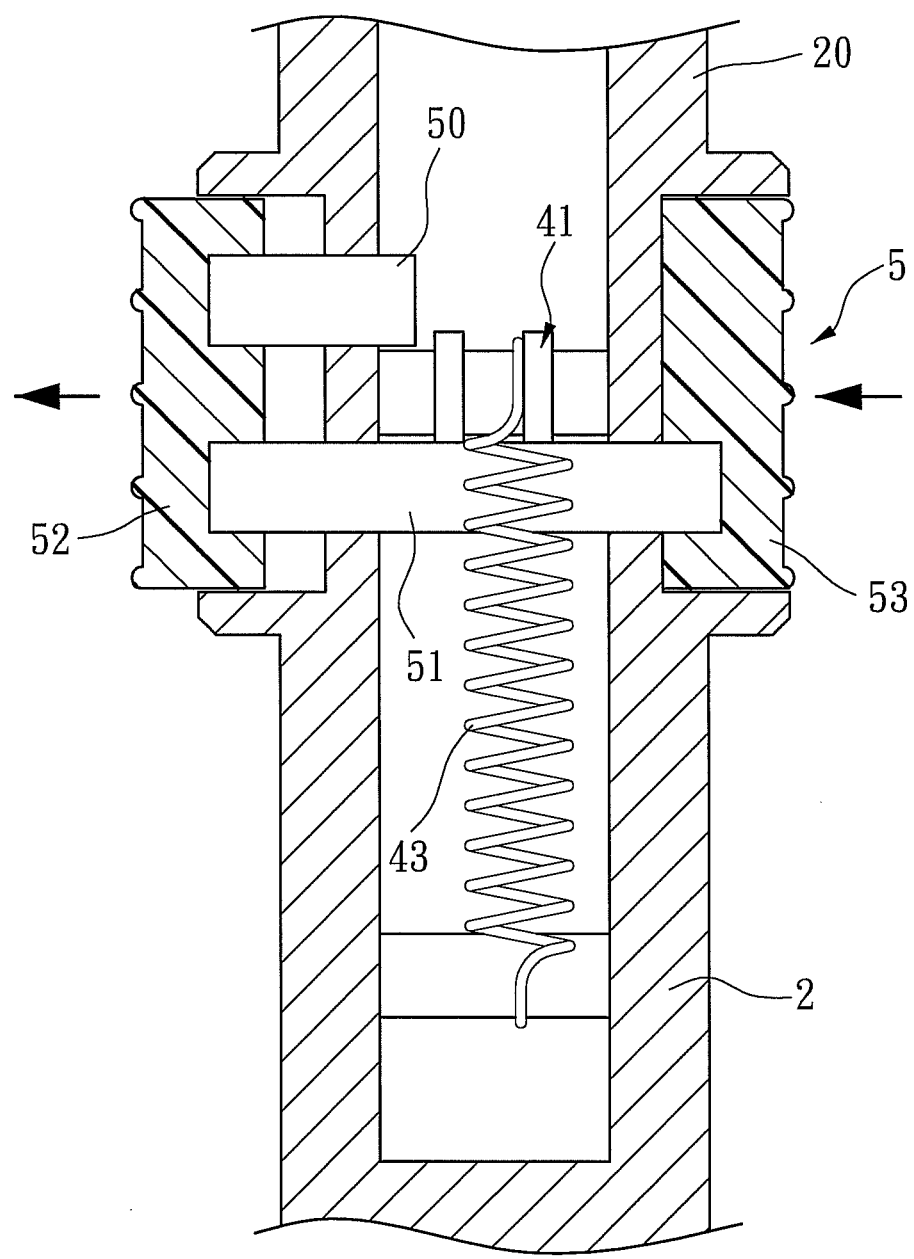
FIG. 5 is a cross-sectional view of pressing a second switching button in accordance with the first preferred embodiment of the present invention.
Figure 6:
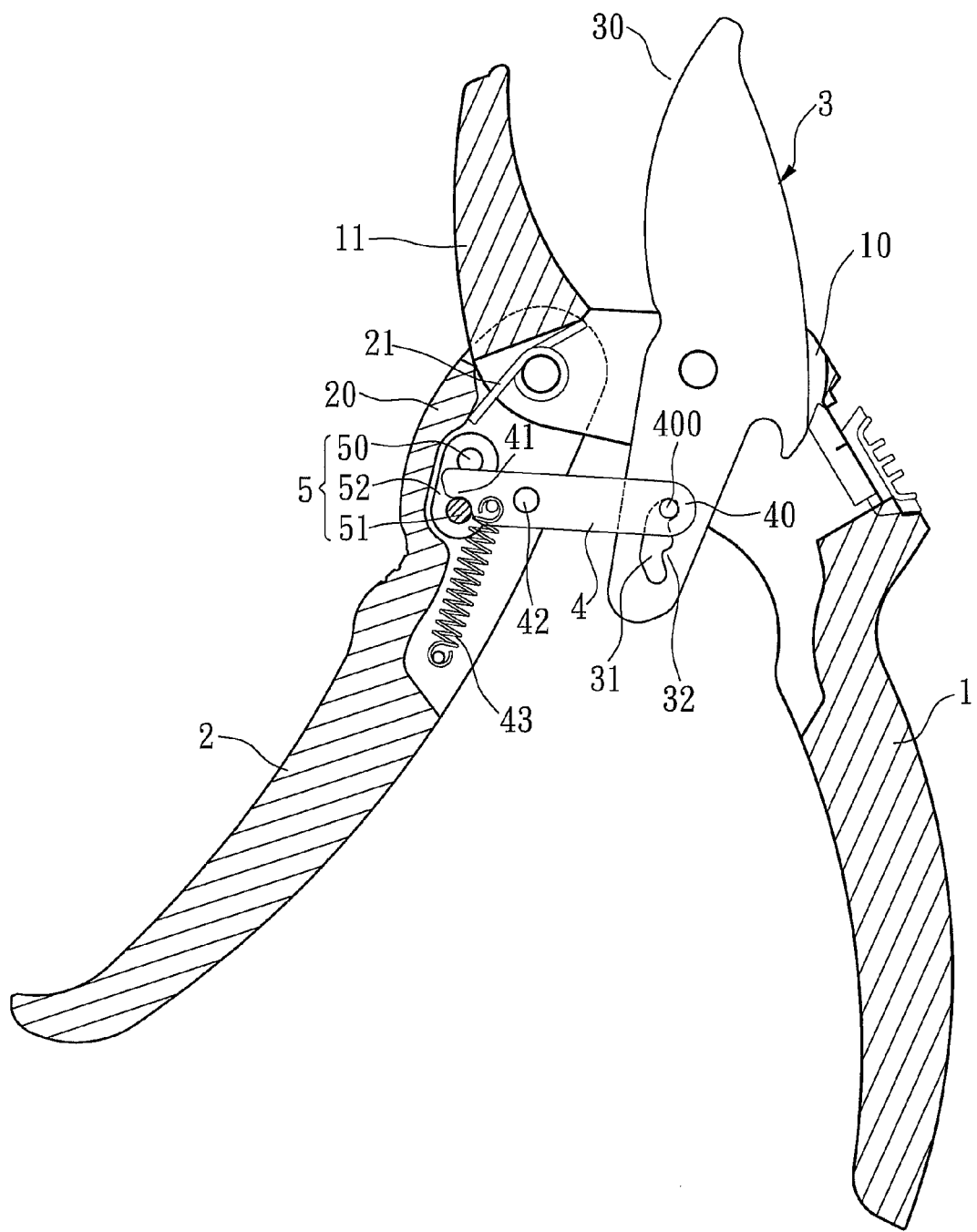
FIG. 6 is a cross-sectional view of an active end of a link rod being limited at a lower fixed position in accordance with the first preferred embodiment of the present invention.

In FIG. 4, when the first switching button 52 of this preferred embodiment is pressed into the second handle 2, the active end 41 of the link rod 4 at the upper fixed position is limited and positioned by the first stop portion 50. Now, the passive end 40 is situated below the long hole 31 as shown in FIG. 2. When the user presses the second handle 2, the plural sections of the stop protrusions 32 in the long hole 31 are provided for the three-stage cutting operation to adhesive the labor-saving cutting effect. In FIG. 5, when the second switching button 53 is pressed into he second handle 2, the first stop portion 50 is moved transversally to leave its position limited by the active end 41, and the active end 41 is downwardly pulled by the tension spring 43 to move downward to the lower fixed position, and limited and positioned by the second stop portion 51 as shown in FIG. 6. Now, the passive end 40 is disposed above the long hole 31. When the user presses the second handle 2, a single-stage cutting movement can provide the quick cutting effect.

From the description above, the present invention has the following advantages. The switching mechanism 5 of the floral scissors of the present invention can drive the active end 41 of the link rod 4 to be positioned at the upper fixed position A and the lower fixed position B, so that the passive end 40 can be switched correspondingly to a position below the long hole 31 or above the long hole 31, so that when the floral scissors are operated, a three-stage or single-stage cutting can be achieved to provide a more convenient horticultural cutting than the conventional floral scissors. The floral scissors of the present invention come with a simple assembly, and thus simplifying the components, lowering the cost, and achieving a quick assembling.

Figure 7:
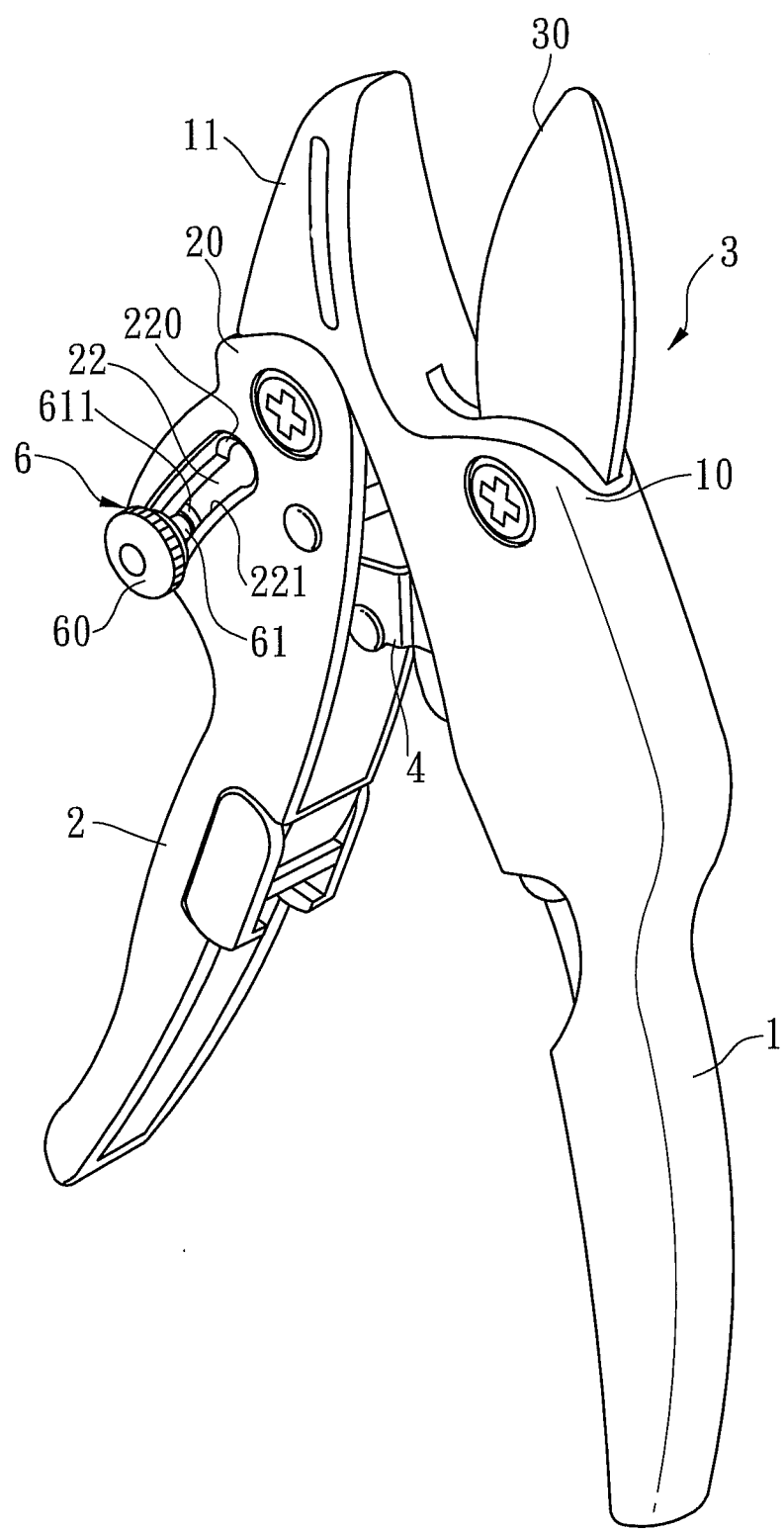
FIG. 7 is a perspective view of a second preferred embodiment of the present invention.
Figure 8:
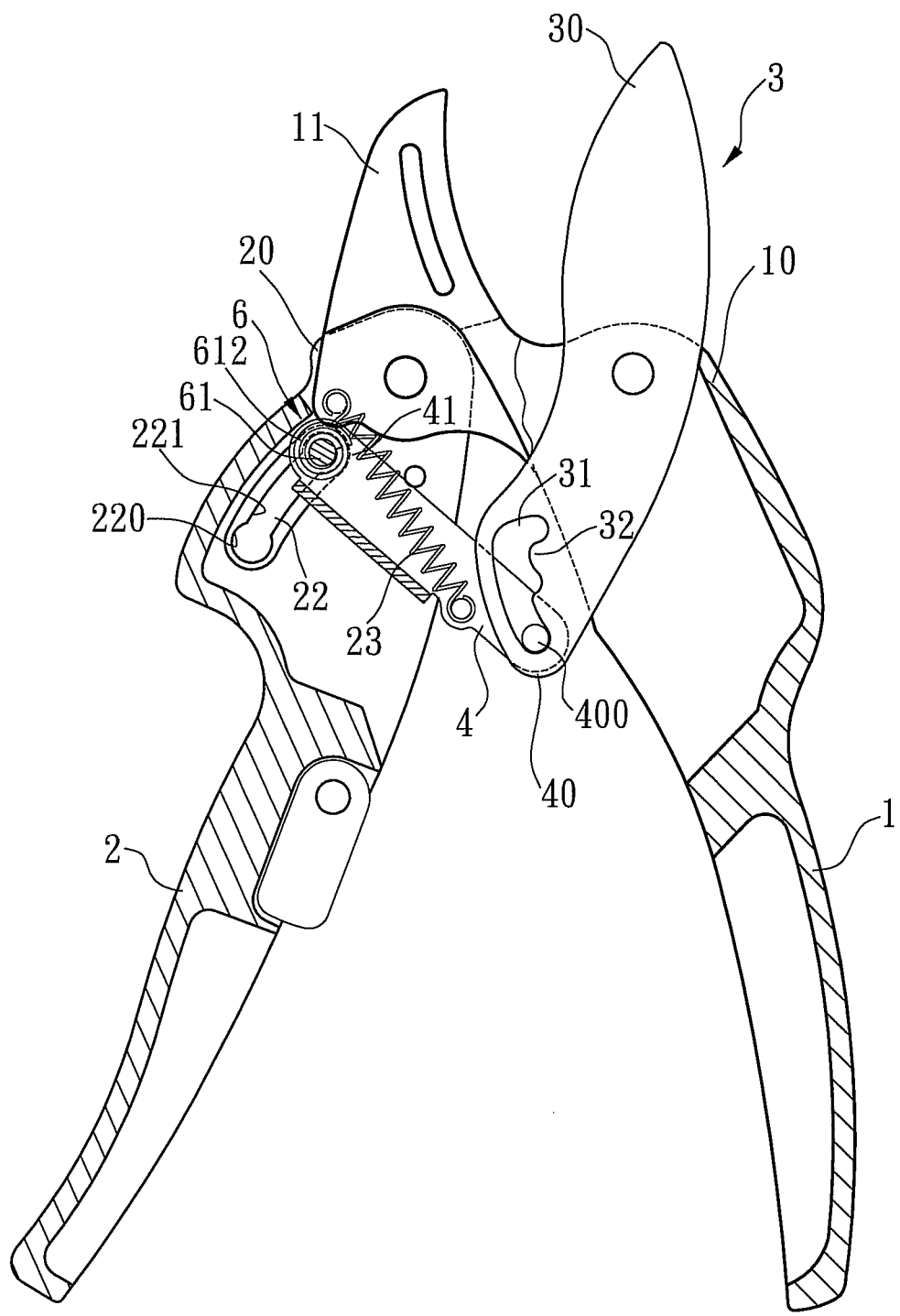
FIG. 8 is a cross-sectional view of an active end of a link rod being limited at an upper fixed position in accordance with the second preferred embodiment of the present invention.

With reference to FIGS. 7 and 8 for the second preferred embodiment of the present invention, the difference of this preferred embodiment from the first preferred embodiment resides on the type of the switching mechanism. In this preferred embodiment, the second handle 2 has a long slot 22 formed between the upper fixed position and the lower fixed position and penetrated through both sides of the second handle 2, and each of the upper fixed position A and the lower fixed position B on a side of the long slot 22 has a large-diameter hole 220, and a small-diameter hole 221 with a reduced diameter is formed between the two large-diameter holes 220, and each of the upper fixed position A and the lower fixed position B on the other side of the long slot 22 has a recess 222, and the active end 41 of the link rod 4 is extended to the internal side of the long slot 22. The switching mechanism 6 of this preferred embodiment is passed through the long slot 22 by a stop portion 61, and the stop portion 61 of this preferred embodiment is a transverse rod with a diameter smaller than the small-diameter hole long hole 221, and the stop portion 61 is also passed through the active end 41. When the stop portion 61 is moved up and down, the active end 41 is driven to move up and down synchronously.

In this preferred embodiment, a press end 60 is disposed at an end of the stop portion 61, and the effect of the press end 60 is the same as the slice member of the first preferred embodiment. In other words, when the press end 60 is pressed, the up and down positions of the active end 41 can be adjusted, and the other end of the stop portion 61 has a stop end 610, and the stop portion 61 has a positioning portion 611 disposed between the press end 60 and the stop end 610, and the press end 60 and the stop end 610 are disposed on the external side of the long slot 22, and the positioning portion 611 is disposed on the internal side of the long slot 22, and the positioning portion 611 has a diameter smaller than the large-diameter hole 220 and greater than the small-diameter hole long hole 221.

Figure 9:
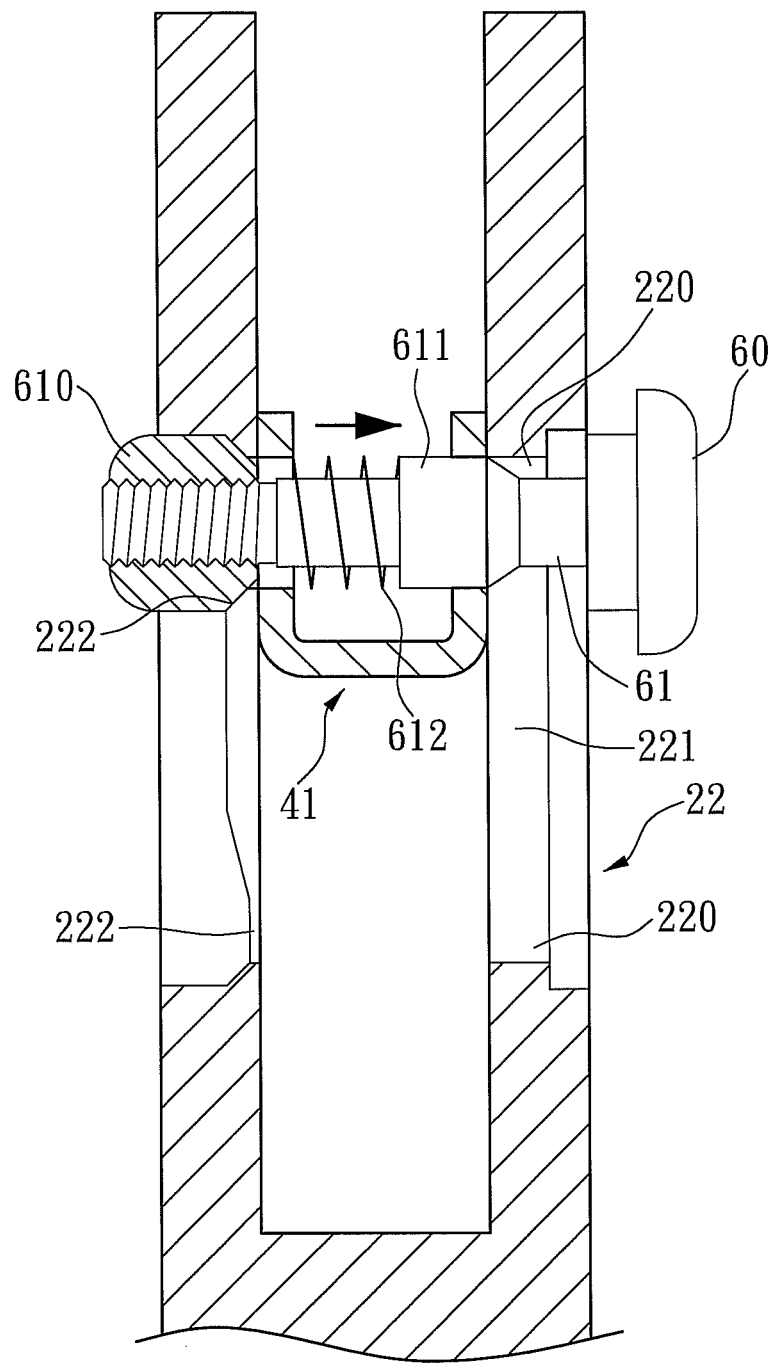
FIG. 9 is a cross-sectional view of a positioning portion being limited at an upper large-diameter hole in accordance with the second preferred embodiment of the present invention.

In FIG. 9, a compression spring 612 is installed between the positioning portion 611 and the active end 41 and in the second handle 2, and when the positioning portion 611 is acted by the compression spring 612 to push in a direction towards the press end 60 to the upper fixed position A and lower fixed position B, the positioning portion 611 is expended into the large-diameter hole 220, and the stop end 610 is now embedded into the two recesses 222.

Figure 10:
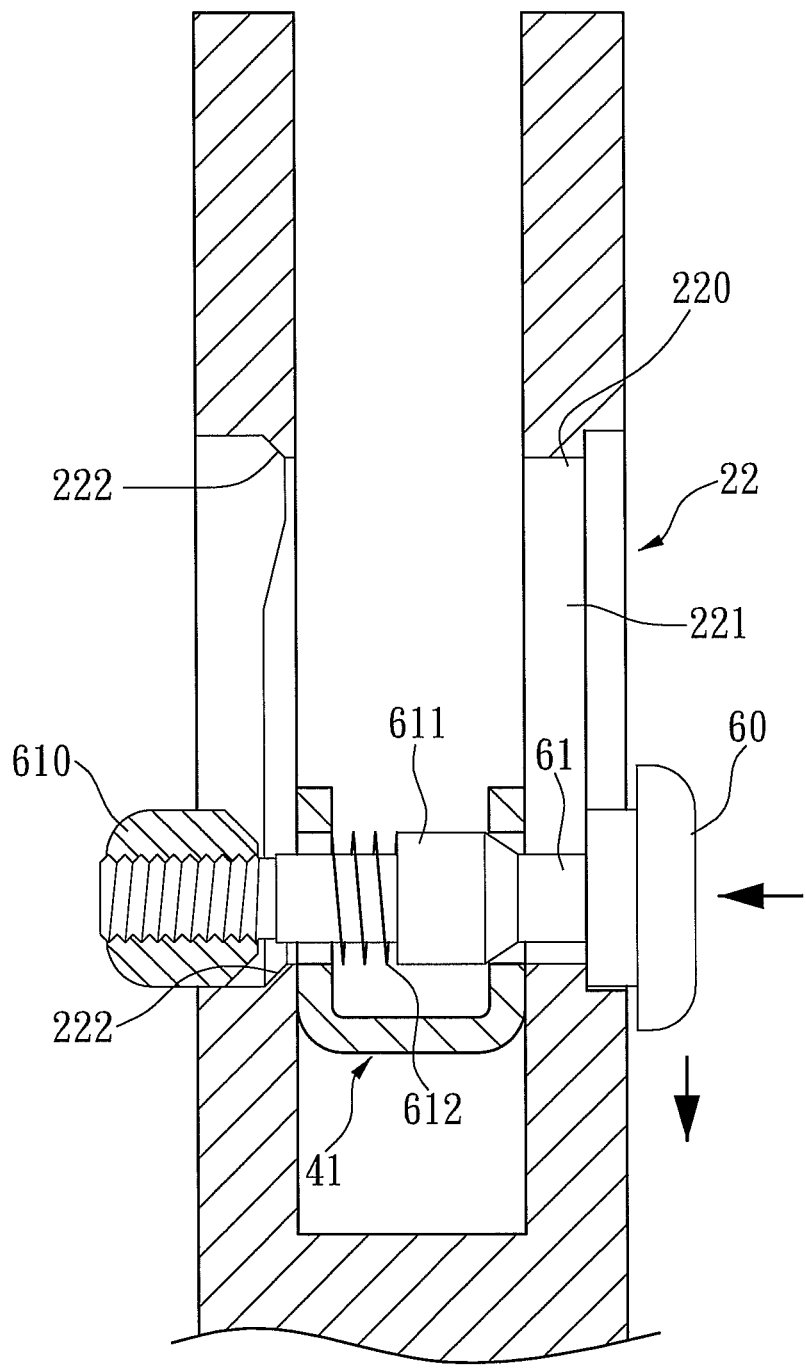
FIG. 10 is a cross-sectional view of a positioning portion being adjusted to a lower large-diameter hole in accordance with the second preferred embodiment of the present invention.
Figure 11:
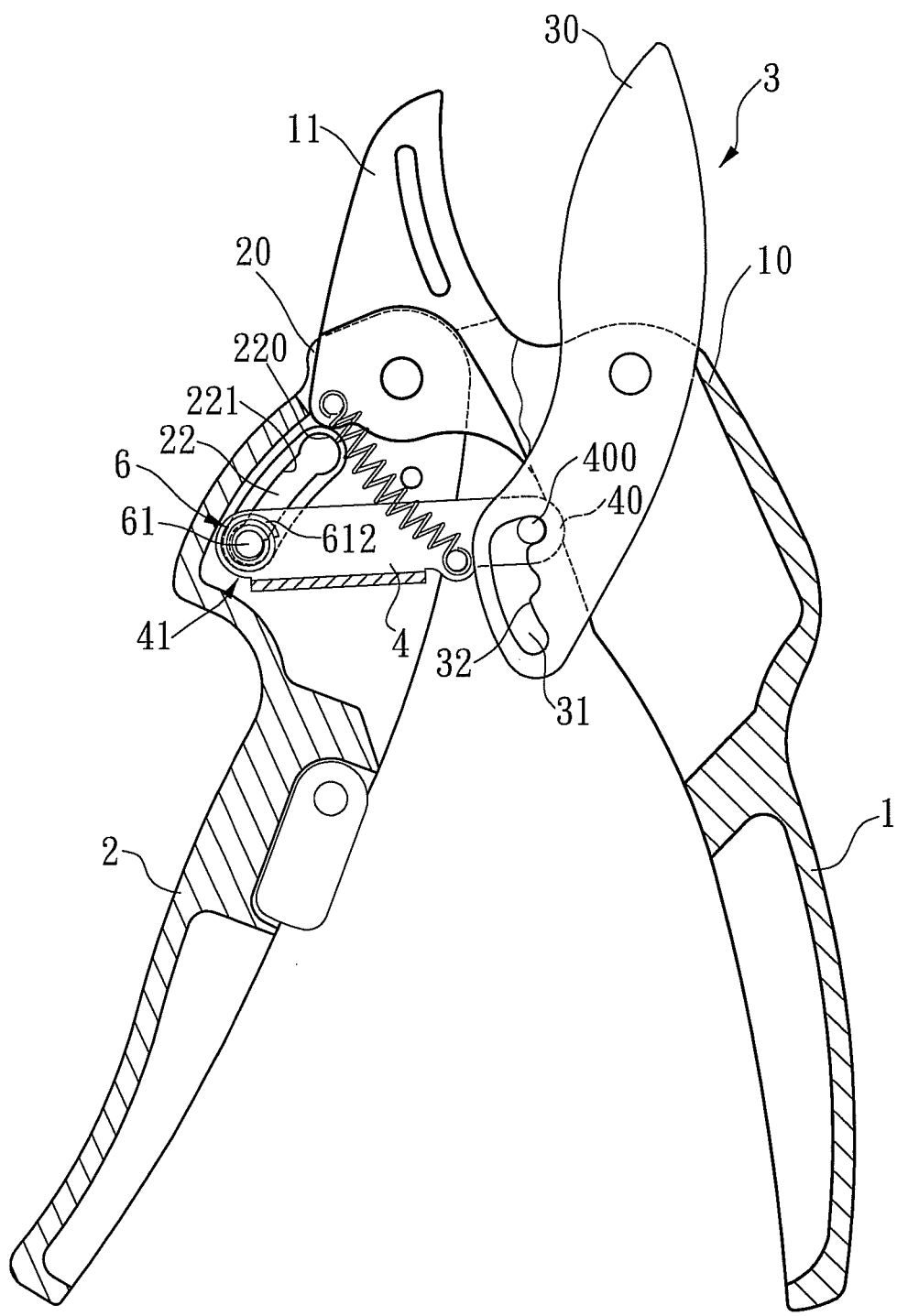
FIG. 11 is a cross-sectional view of an active end of a link rod being limited at a lower fixed position in accordance with the second preferred embodiment of the present invention.
Figure 12:
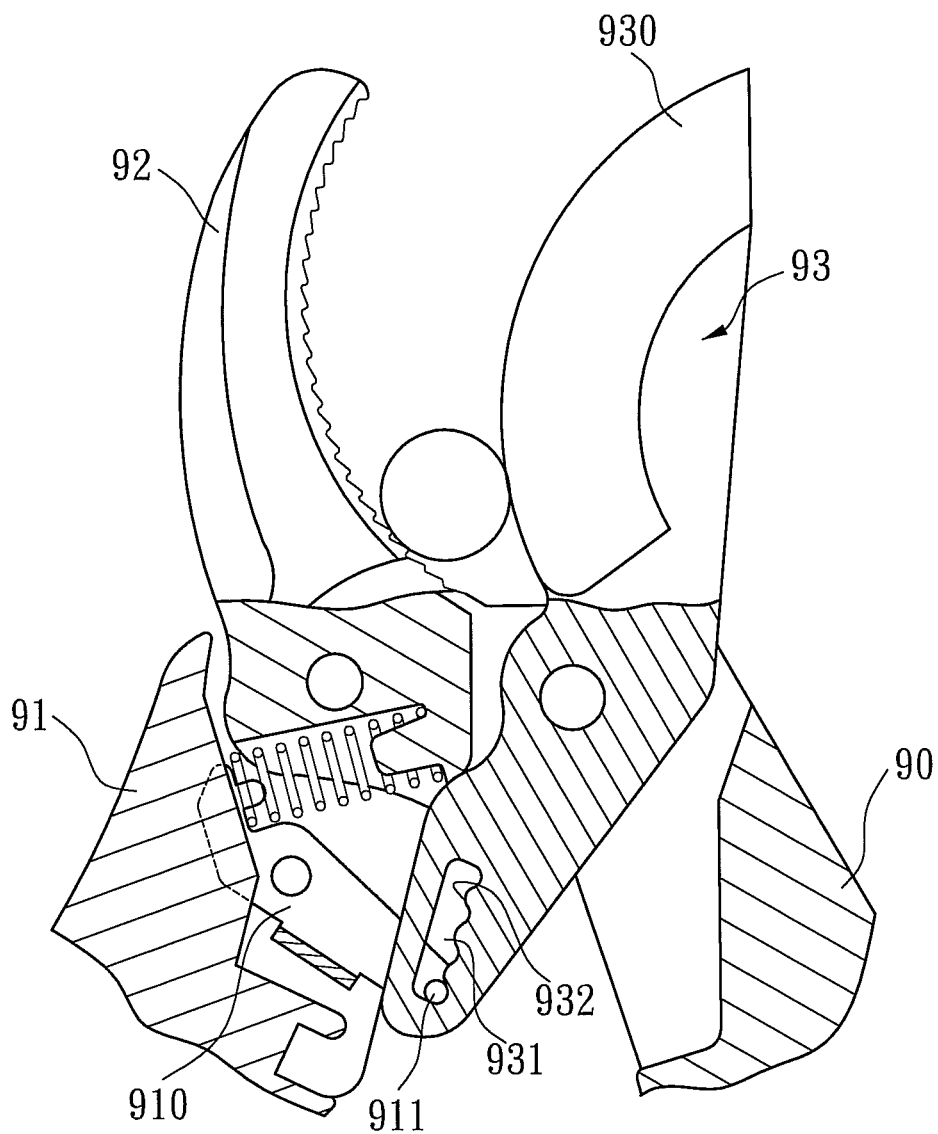
FIG. 12 is a cross-sectional view of a conventional floral scissors at a starting position of cutting a branch.
Figure 13:
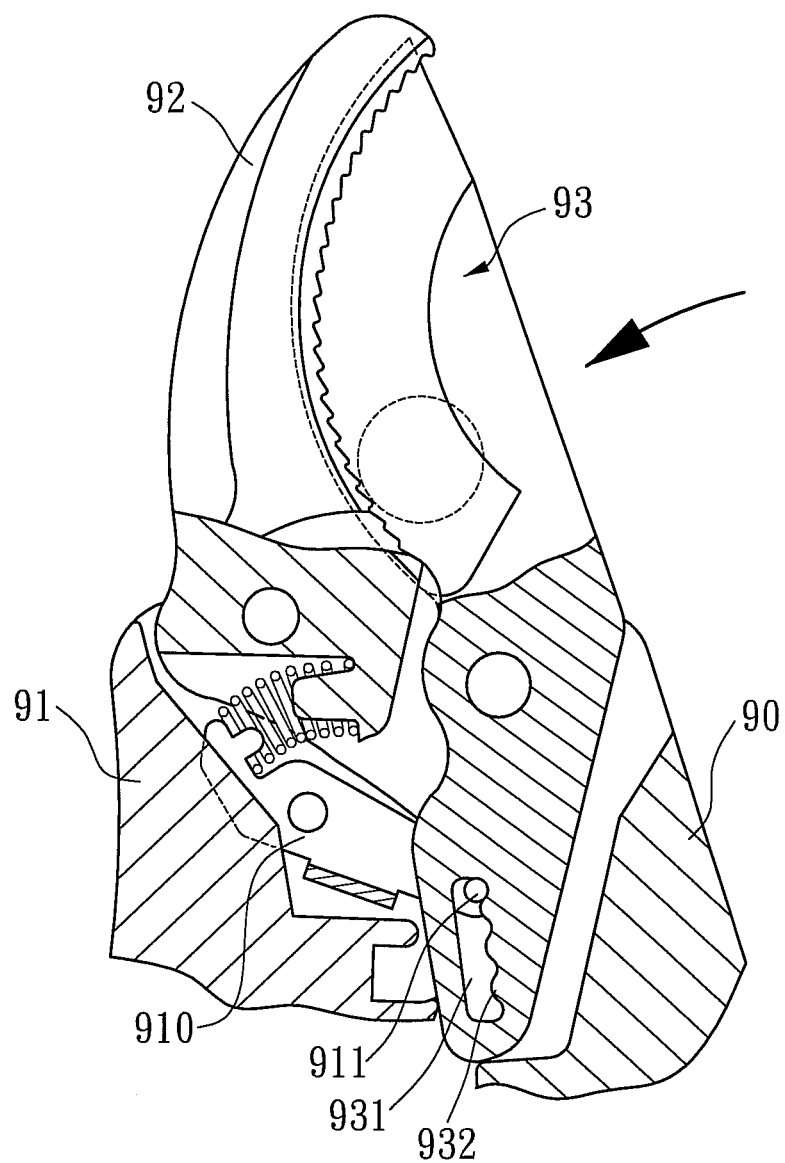
FIG. 13 is a cross-sectional view of a conventional floral scissors at a finishing position of cutting a branch.

In FIG. 10, after a force is applied to press the press end 60, the positioning portion 611 is retracted axially into the second handle 2 to leave the large-diameter hole 220, and the stop end 610 leaves the recess 222. Since the stop portion 61 is smaller than the large-diameter hole 220 which is smaller than the small-diameter hole 221, therefore the stop portion 61 can be pivotally swung in the small-diameter hole long hole 221 and between the upper fixed position and the lower fixed position. Now, the active end 41 is also pivotally swung with the stop portion 61 and moved between the upper fixed position and the lower fixed position, and the press end 60 can be released selectively at the position of one of the large-diameter holes 220, so that the positioning portion 611 is extended into the large-diameter hole 220 again and positioned. Therefore, a three-stage cutting mode can be switched to a single-stage cutting mode as shown in FIG. 8.

In this preferred embodiment, the second handle 2 has a tension spring 23 installed on an internal side of the second pivoting portion 20, and the tension spring 23 is the same as the torque spring 21 of the first preferred embodiment for spreading open the two handles and resuming their positions, and an end of the tension spring 23 is coupled between the active end 41 and the passive end 40 of the link rod 4, and the other end of the tension spring 23 is coupled to an outer side of the clamping jaw 11.

Although the structure of the switching mechanism 6 of this preferred embodiment is different from the structure of the switching mechanism 5 of the first preferred embodiment, both of them can move the active end 41 of the link rod 4 between the upper fixed position A and the lower fixed position B, so that the stop pin 400 of the passive end 40 can be moved up and down correspondingly in the long hole 31 to achieve the same effect of the first preferred embodiment.

In summation of the description above, the present invention improves over the prior art and complies with the patent application requirements, and thus is duly file for patent application. While the invention has been described by means of specific embodiments, numerous modifications and variations could be made thereto by those skilled in the art without departing from the scope and spirit of the invention set forth in the claims.

What is claimed is:

1. An improved floral scissors assembly, comprising:
    a first handle, having a first pivoting portion disposed at a top end of the first handle, and a clamping jaw integrally extended in a lateral direction from the first pivoting portion;
    a blade, having a cutting-edge portion, and pivotally coupled to the first pivoting portion by a root portion of the cutting-edge portion, and the cutting-edge portion being disposed at the top of the first pivoting portion and facing the clamping jaw, and the blade having a long hole formed at an end extended from an internal side of the first pivoting portion, and a stop protrusion having a plurality of sections formed on a sidewall of the long hole;
    a second handle, having a second pivoting portion disposed at a top end of the second handle and pivotally coupled to the bottom of the clamping jaw;
    a link rod, having a passive end, and the passive end having a stop pin passed into the long hole, and an active end disposed at the other end of the passive end and extended into the second handle;
    a switching mechanism, installed at the second handle, and proximate to the second pivoting portion, and the switching mechanism including a slice member exposed from an external side of the second handle, and at least one stop portion disposed on an internal side of the second handle, and the at least one stop portion including an upper fixed position and a lower fixed position on the internal side of the second handle, and the active end of the link rod being switchably limited at the upper fixed position and the lower fixed position by the at least one stop portion, and the stop pin being moved in an opposite direction of the active end and between the upper end and the lower end in the long hole.

2. The improved floral scissors assembly of claim 1, wherein the link rod at the position proximate to the active end is pivotally coupled to the second handle by a shaft, and both ends of the link rod are swung by using the shaft as a fulcrum, and the active end is maintained at a condition of being downwardly pulled by a tension spring; the slice member includes a first switching button and a second switching button embedded into both sides of the second handle respectively, a first stop portion being a transverse rod disposed at the upper fixed position between the two switching buttons and having an end fixed to the first switching button, and a hollow formed between the other end of the first stop portion and the second switching button, and the two switching buttons at the lower fixed position are coupled with each other by a second stop portion which is also a transverse rod, and an active end of the link rod at the upper fixed position is limited and positioned by the first stop portion when the first switching button is pressed into the second handle, and when the second switching button is pressed into the second handle, the first stop portion is moved transversally to leave the fixing position for limiting the active end, and the active end is pulled downwardly by the tension spring to move downward to the lower fixed position and limited and positioned by the second stop portion.

3. The improved floral scissors assembly of claim 2, further comprising a torque spring installed between the second pivoting portion of the second handle and the clamping jaw for spreading open the two handles to resume their original positions, and an end of the torque spring abuts the second handle against the internal side of the second pivoting portion, and the other end of the torque spring abuts against the internal side of the clamping jaw.

4. The improved floral scissors assembly of claim 1, wherein the second handle has a long slot formed between the upper fixed position and the lower fixed position and penetrated through both sides of the second handle, and each of the upper fixed position and the lower fixed position on a side of the long slot has a large-diameter hole, and a small-diameter hole with a reduced diameter is formed between the two large-diameter holes, and each of the upper fixed position and the lower fixed position on the other side of the long slot has a recess, and the active end of the link rod is extended towards the internal side of the second handle to the long slot, and a stop portion being a transverse rod with a diameter smaller than the small-diameter hole is passed through the long slot, and the stop portion is also passed through the active end, and the slice member has a press end formed at an end of the stop portion, and the other end of the stop portion has a stop end, and a positioning portion is disposed between the press end and the stop end, and the positioning portion has a diameter smaller than the large-diameter hole and greater than the small-diameter hole, and the press end and the stop end are disposed on the external side of the second handle, and the positioning portion is disposed on the internal side of the second handle, and a compression spring is installed between the positioning portion and the active end of the second handle, and when the positioning portion is acted by the compression spring to push in a direction towards the press end to the upper fixed position and lower fixed position, the positioning portion is extended into the large-diameter hole, and the stop end is embedded into each of the recesses.

5. The improved floral scissors assembly of claim 4, wherein the second handle includes a tension spring installed on the internal side of the second pivoting portion for spreading open the two handles to resume their original positions, and an end of the tension spring is coupled between the active end and passive end of the link rod, and the other end of the tension spring is coupled to a side proximate to the exterior of the clamping jaw.

* * * * *